(12) United States Patent
Loh et al.

(10) Patent No.: US 12,460,540 B2
(45) Date of Patent: Nov. 4, 2025

(54) PRESSURE SENSOR AND BOREHOLE SYSTEM

(71) Applicant: Baker Hughes Oilfield Operations LLC, Houston, TX (US)

(72) Inventors: Yuh Loh, Cypress, TX (US); Javid Akhtar Majid, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 278 days.

(21) Appl. No.: 18/447,757

(22) Filed: Aug. 10, 2023

(65) Prior Publication Data

US 2024/0102381 A1 Mar. 28, 2024

Related U.S. Application Data

(60) Provisional application No. 63/410,299, filed on Sep. 27, 2022.

(51) Int. Cl.
*E21B 47/06* (2012.01)
*G01L 7/06* (2006.01)
*G01L 19/14* (2006.01)

(52) U.S. Cl.
CPC ............ *E21B 47/06* (2013.01); *G01L 7/061* (2013.01); *G01L 19/141* (2013.01)

(58) Field of Classification Search
CPC ......... E21B 47/06; G01L 7/061; G01L 7/082; G01L 7/166
USPC .......... 73/152.51, 706, 715, 721, 729.1, 754
See application file for complete search history.

(56) References Cited

U.S. PATENT DOCUMENTS

| | | | | |
|---|---|---|---|---|
| 3,033,039 A | * | 5/1962 | McMillan | G01L 9/0035 73/719 |
| 3,633,414 A | * | 1/1972 | Field | E21B 47/06 73/152.38 |
| 3,744,307 A | * | 7/1973 | Harper | E21B 47/06 73/706 |
| 3,810,387 A | * | 5/1974 | Stancliff | E21B 47/06 73/152.53 |
| 3,894,435 A | * | 7/1975 | Shimada | F02D 3/00 338/42 |
| 4,027,661 A | * | 6/1977 | Lyon | G01L 9/0039 376/288 |
| 4,161,886 A | * | 7/1979 | Eshelman | G01L 9/0036 73/728 |

(Continued)

FOREIGN PATENT DOCUMENTS

EP 0695853 A2 2/1996

OTHER PUBLICATIONS

Jurgaitis "Let's Talk about PEEK and Crystallinity" Spectrum Plastics Group (Year: 2025).*

(Continued)

*Primary Examiner* — John Fitzgerald
(74) *Attorney, Agent, or Firm* — Baker Hughes Patent Organization

(57) ABSTRACT

A pressure sensor including a transducer housing, a transducer crystal disposed in the housing in vacuum conditions, a driver in contact with the crystal transducer, and a deflectable member in contact with the driver on one surface and exposed to ambient pressure on the opposite surface thereof. A borehole system including a borehole in a subsurface formation, a string in the borehole, and a sensor connected to the string.

5 Claims, 2 Drawing Sheets

(56) References Cited

U.S. PATENT DOCUMENTS

| | | | |
|---|---|---|---|
| 4,297,880 A * | 11/1981 | Berger | E21B 47/10 |
| | | | 73/152.22 |
| 4,507,972 A | 4/1985 | Morita | |
| 5,024,098 A * | 6/1991 | Petitjean | G01L 19/0046 |
| | | | 73/706 |
| 5,307,684 A * | 5/1994 | Moss | G01L 19/0609 |
| | | | 73/717 |
| 5,337,612 A | 8/1994 | Evans | |
| 6,255,609 B1 * | 7/2001 | Samuelson | G01L 9/0089 |
| | | | 73/728 |
| 7,152,466 B2 * | 12/2006 | Ramakrishnan | E21B 47/06 |
| | | | 73/152.26 |
| 7,322,246 B2 * | 1/2008 | Miller | G01L 9/0077 |
| | | | 73/715 |
| 8,689,620 B2 * | 4/2014 | Ratcliffe | E21B 47/007 |
| | | | 73/152.51 |
| 9,829,404 B2 * | 11/2017 | Yamada | G01L 7/082 |
| 10,578,506 B2 * | 3/2020 | Yamada | G01L 19/0681 |
| 2003/0101822 A1 * | 6/2003 | Atherton | E21B 47/06 |
| | | | 73/579 |
| 2007/0056378 A1 * | 3/2007 | Ishii | G01L 9/0033 |
| | | | 73/729.1 |
| 2009/0241678 A1 | 10/2009 | Motoyama | |
| 2010/0147083 A1 | 6/2010 | Tan et al. | |
| 2020/0200636 A1 * | 6/2020 | Fuji | G01L 23/10 |

OTHER PUBLICATIONS

Notification of Transmittal of the International Search Report and the Written Opinion of the International Searching Authority, or the Declaration; PCT/US2023/032500; Mail date: Jan. 3, 2024; 9 pages.

* cited by examiner

PRESSURE SENSOR AND BOREHOLE SYSTEM

CROSS REFERENCE TO RELATED APPLICATIONS

This application claims the benefit of an earlier filing date from U.S. Provisional Application Ser. No. 63/410,299 filed Sep. 27, 2022, the entire disclosure of which is incorporated herein by reference.

BACKGROUND

In the resource recovery and fluid sequestration industries it is often important to have information about pressure in the downhole environment. There are many pressures sensors known to the art including some that use a bellows containing a hydraulic oil and a crystal transducer to monitor pressure in the hydraulic oil within the bellows. Pressure in the bellows is dictated by ambient pressure that is acting on the bellows from outwardly thereof. While these sensors are ubiquitously used, they suffer from leaks that can cause issues with other components or reduce effectiveness of the entire arrangement. Assembly of these sensors is cumbersome and requires particular skill and experience. The art would welcome alternatives.

SUMMARY

An embodiment of a pressure sensor including a transducer housing, a transducer crystal disposed in the housing in vacuum conditions, a driver in contact with the transducer, and a deflectable member in contact with the driver on one surface and exposed to ambient pressure on the opposite surface thereof.

An embodiment of a borehole system including a borehole in a subsurface formation, a string in the borehole, and a sensor connected to the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
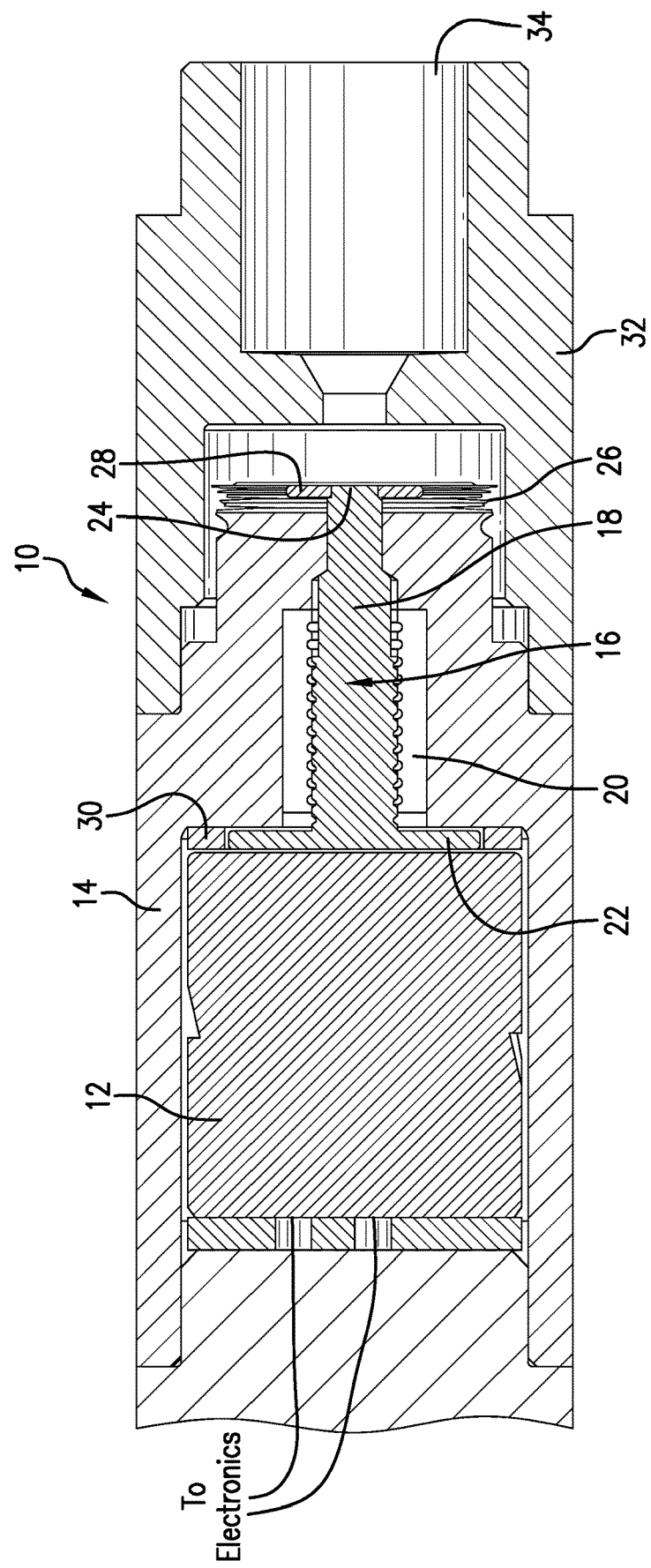
FIG. 1 is a cross sectional view of a pressure sensor in accordance with the disclosure herein.

Referring to FIG. 1, a cross section view of a sensor 10 is illustrated. Sensor 10 includes a transducer crystal 12 disposed in a transducer housing 14 that may be in some instances a Polyetherether Ketone material. Other materials are also contemplated. The housing 14 protects the crystal 12 and maintains the position of the crystal 12 relative to other components of the sensor 10. Sensor 10 further includes a driver 16. The driver 16 includes a shaft that may be configured as a screw portion 18 of a ball screw arrangement or a roller screw arrangement, with the ball nut or roller nut being illustrated at 20, or may be a pin (essentially the same as the screw portion but without threads, and with the ball nut or roller nut 20 simply being a bushing). An output end 22 of the driver 16 is in close proximity or contact with the crystal 12. End 22 makes stronger or weaker contact with the crystal 12 based upon input from ambient pressure. On an opposite end of the driver 16, an input end 24 is illustrated. Input end 24 is in operable contact with a deflectable member 26, such as a bellows or a diaphragm. Ambient pressure acting on the member 26 will transfer a load to the driver 16 and hence to the crystal 12. Pressure readings in the crystal will vary accordingly. In an embodiment, the end 24 is provided with a load spreader 28 that helps to avoid damage to the bellows caused by end 24. In embodiments, the spreader 28 may be slide on, thread on, or secured with braze, weld, etc. In some embodiments, there will be a centralizer 30 cooperating with end 22 to maintain its centered position on the crystal 12.

Pressure from the ambient environment accesses the member 26 through any opening to the environment outside of a member housing 32 such as through opening 34. Ambient pressure on the member 26 is transmitted to the driver 16, which then transmits that pressure directly to the crystal 12, which changes its electrical signature as a transducer is wont to do under mechanical stress. Since the crystal 12 is not disposed in hydraulic oil but rather in air or other gaseous atmosphere at about atmospheric pressure or lower, such as a nitrogen atmosphere. Also contemplated is an atmosphere at near vacuum as a byproduct of other operations such as electron beam welding operations during manufacture, for example. These possible atmospheres and pressures means that there need not be feedthrough seals to prevent infiltration of hydraulic fluid to the electronics (not shown) that are necessarily connected to the crystal 12. Rather, a standard electrical connection can be made to the crystal 12 that electrically links the crystal 12 to the electronics package of the sensor 10.

Figure 2:
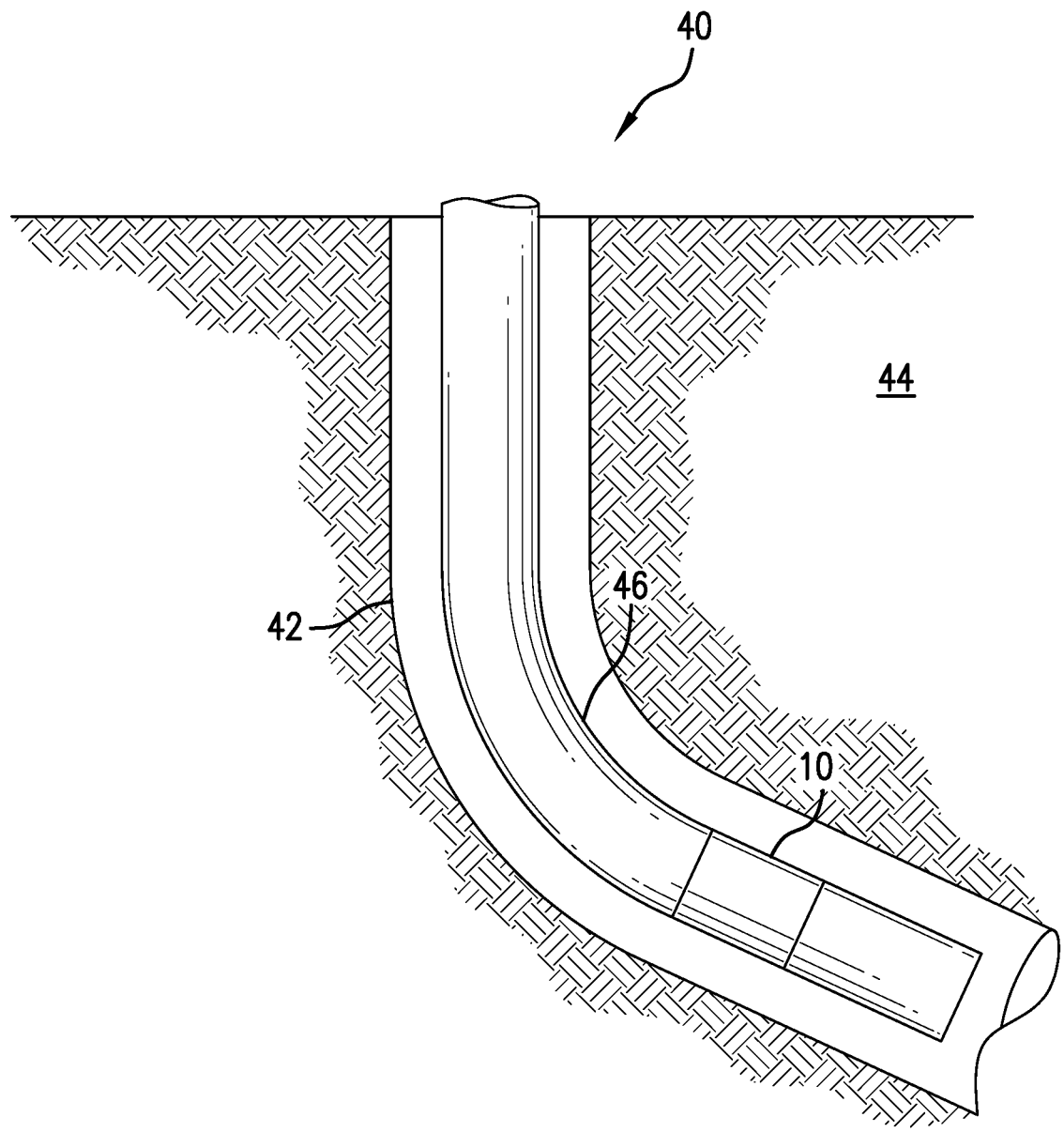
FIG. 2 is a view of a borehole system including the pressure sensor as disclosed herein.

Referring to FIG. 2, a borehole system 40 is illustrated. The system 40 comprises a borehole 42 in a subsurface formation 44. A string 46 is disposed within the borehole 42. The sensor 10 is disposed within or as a part of the string 46.

Set forth below are some embodiments of the foregoing disclosure:

Embodiment 1: A pressure sensor including a transducer housing, a transducer crystal disposed in the housing in vacuum conditions, a driver in contact with the transducer, and a deflectable member in contact with the driver on one surface and exposed to ambient pressure on the opposite surface thereof.

Embodiment 2: The sensor as in any prior embodiment, wherein the pin includes a thread.

Embodiment 3: The sensor as in any prior embodiment, further comprising a ball nut in threadable communication with the pin thread.

Embodiment 4: The sensor as in any prior embodiment, further comprising a roller screw nut in threadable communication with the pin thread.

Embodiment 5: The sensor as in any prior embodiment, further including a spreader disposed at an input end of the driver.

Embodiment 6: The sensor as in any prior embodiment, wherein the driver is in contact with the crystal at an output end of the driver and the output end of the driver is in operative communication with a centralizer.

Embodiment 7: The sensor as in any prior embodiment, wherein the deflectable member is a bellows.

Embodiment 8: A borehole system including a borehole in a subsurface formation, a string in the borehole, and a sensor as in any prior embodiment connected to the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A pressure sensor comprising:
   a transducer housing;
   a transducer crystal disposed in the housing in vacuum conditions;
   a threaded driver in contact with the transducer;
   a ball nut or roller screw nut in threaded contact with the driver to moderate response time to a pressure change on the sensor; and
   a deflectable member in contact with the driver on one surface and exposed to ambient pressure on the opposite surface thereof.

2. The sensor as claimed in claim 1, further including a spreader disposed at an input end of the driver.

3. The sensor as claimed in claim 1, wherein the driver is in contact with the crystal at an output end of the driver and the output end of the driver is in operative communication with a centralizer.

4. The sensor as claimed in claim 1, wherein the deflectable member is a bellows.

5. A borehole system comprising:
   a borehole in a subsurface formation;
   a string in the borehole; and
   a sensor as claimed in claim 1 connected to the string.

* * * * *